(12) United States Patent
Bui et al.

(10) Patent No.: US 8,572,154 B2
(45) Date of Patent: Oct. 29, 2013

(54) REDUCED-LEVEL TWO'S COMPLEMENT ARITHMETIC UNIT

(75) Inventors: Duc Q. Bui, Grand Prairie, TX (US); Timothy D. Anderson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 537 days.

(21) Appl. No.: 12/891,708

(22) Filed: Sep. 27, 2010

(65) Prior Publication Data

US 2012/0078993 A1 Mar. 29, 2012

(51) Int. Cl.
*G06F 7/50* (2006.01)

(52) U.S. Cl.
USPC .......................... 708/670; 708/700

(58) Field of Classification Search
USPC ................................ 708/670, 700
See application file for complete search history.

(56) References Cited

U.S. PATENT DOCUMENTS

| | | | | |
|---|---|---|---|---|
| 4,698,771 A | * | 10/1987 | Mills et al. | 708/670 |
| 6,629,118 B1 | * | 9/2003 | Hutchison et al. | 708/525 |
| 7,617,269 B2 | * | 11/2009 | Dewan | 708/700 |

* cited by examiner

*Primary Examiner* — Tan V. Mai
(74) *Attorney, Agent, or Firm* — Robert D. Marshall, Jr.; Wade James Brady, III; Frederick J. Telecky, Jr.

(57) ABSTRACT

A processor includes a two's complement arithmetic unit that reduces a level of complexity in the critical path by eliminating the addition of the "1" to the carry in of the two's complement arithmetic unit. To execute a subtraction instruction using two's complement arithmetic, the subtraction as disclosed herein is performed in accordance with the identity "A−B=not (not (A)+B)," where A is a first operand and B is a second operand that is to be subtracted from A. Accordingly, the addition of the "1" term into the carry in is eliminated, and reduces a level of complexity that would otherwise slow down and/or limit the speed at which a subtraction instruction can be performed.

17 Claims, 4 Drawing Sheets

REDUCED-LEVEL TWO'S COMPLEMENT ARITHMETIC UNIT

BACKGROUND

Instructions used in general-purpose processors typically include arithmetic instructions. Arithmetic instructions often include two operands that are numbers to be, for example, added to or subtracted from each other. To execute a subtraction instruction using two's complement arithmetic, the subtraction is typically performed in accordance with the identity:

$$A-B=A+\text{not}(B)+1$$

where A is a first operand and B is a second operand that is to be subtracted from A. Thus in an arithmetic unit for performing the two's complement subtraction, the B operand is complemented, and a "1" is added (as a "carry in") to the least significant bit (LSB) of A as well as the complement of B. The addition of the "1" term into the carry in extends the carry-chain of the arithmetic unit and adds a level of complexity that slows down and/or limits the speed at which the instruction can be performed. The carry-chain of this computation is usually part of a timing critical path, especially if the instruction is to be executed in a single cycle, and thus can be limiting to the speed of a processor.

SUMMARY

The problems noted above are solved in large part by a processor as disclosed herein that includes a two's complement arithmetic unit that reduces a level of complexity in the critical path by eliminating the addition of the "1" to the carry in of the two's complement arithmetic unit. To execute a subtraction instruction using two's complement arithmetic, the subtraction as disclosed herein is performed in accordance with the identity:

$$A-B=\text{not}(\text{not}(A)+B)$$

where A is a first operand and B is a second operand that is to be subtracted from A. Accordingly, the addition of the "1" term into the carry in is eliminated, and as such reduces a level of complexity that would otherwise slow down and/or limit the speed at which a subtraction instruction can be performed.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . " Also, the terms "coupled to" or "couples with" (and the like) are intended to describe either an indirect or direct electrical connection. Thus, if a first device couples to a second device, that connection may be through a direct electrical connection, or through an indirect electrical connection via other devices and connections.

Figure 1:
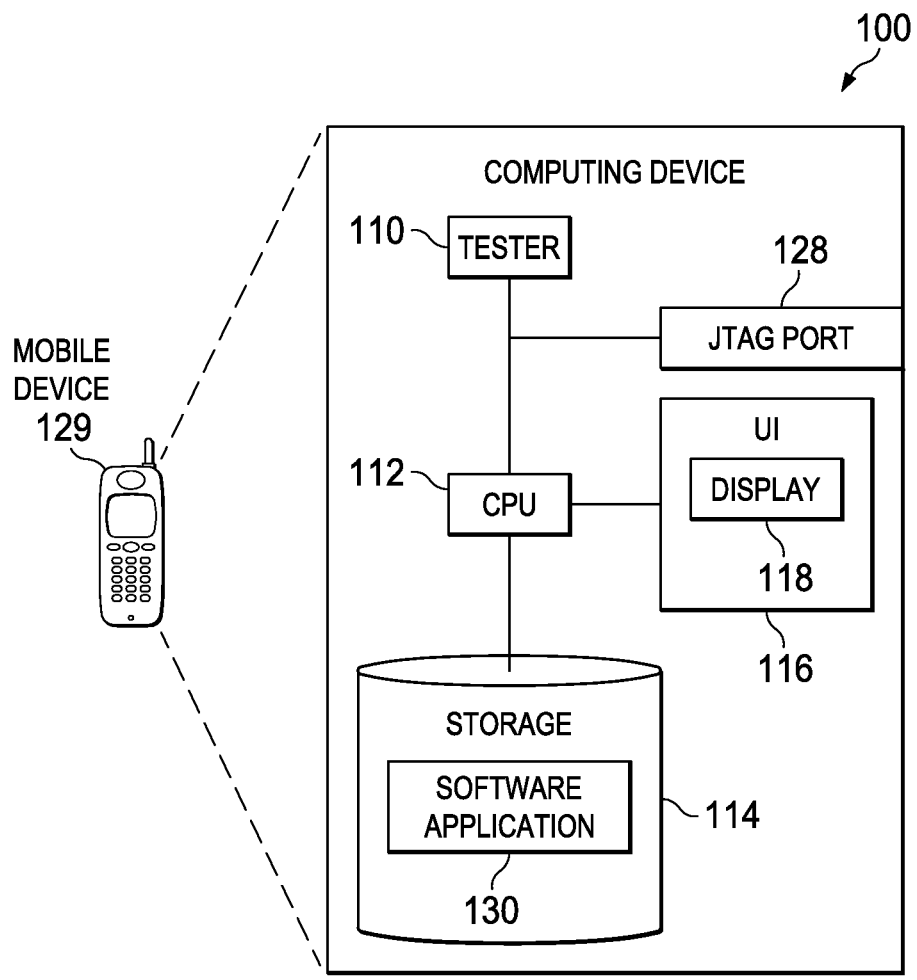
FIG. 1 shows an illustrative computing device 100 in accordance with embodiments of the disclosure.

FIG. 1 shows an illustrative computing device 100 in accordance with embodiments of the disclosure. The computing device 100 is, or is incorporated into, a mobile communication device 129, such as a mobile phone, a personal digital assistant (e.g., a BLACKBERRY® device), a personal computer, or any other type of electronic system.

In some embodiments, the computing device 100 comprises a megacell or a system-on-chip (SoC) which includes control logic such as a processor (CPU) 112 (which, for example, can be a CISC-type CPU, RISC-type CPU, or a digital signal processor (DSP)), a storage 114 medium (e.g., random access memory (RAM)) and a tester 110. The storage 114 stores one or more software applications 130 (e.g., embedded applications) that, when executed by the processor 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 so that a software developer can verify how the component(s), were it actually present on the computing device 100, would perform in various situations (e.g., how the component(s) would interact with the software application 130). In this way, the software application 130 can be debugged in an environment which resembles post-production operation.

The processor 112 typically comprises memory and logic which store information frequently accessed from the storage 114. The computing device 100 is often controlled by a user using a UI (user interface) 116, which typically provides output to and receives input from the user during the execution the software application 130. The output is provided using the display 118, a speaker, vibrations, and the like. The input is received using audio inputs (using, for example, voice recognition), and mechanical devices such as keypads, switches, proximity detectors and the like. These and other input and output devices are coupled to the computing device 100 by external devices using wireless or cabled connections.

The processor as disclosed herein includes a reduced-level two's complement arithmetic unit accordance with the identity:

$$A-B=\text{not}(\text{not}(A)+B)$$

where A is a first operand that is to be subtracted from a second operand B. Accordingly, the addition of the "1" term into the carry in of the first bit is eliminated, and as such reduces a level of complexity that would otherwise slow down and/or limit the speed at which a subtraction instruction can be performed.

As disclosed herein, the processor 112 includes a reduced-level two's complement arithmetic unit for performing a subtraction independently of a conventional "carry in" addition of "1" to the LSB of the sum of A (a first operand) and the complement of B (a second operand). The computation of carry chain is usually part of a timing critical path through the arithmetic unit of the processor 112. Accordingly, the reduced-level two's complement arithmetic unit as disclosed herein reduces the number of logic levels involved in the computation of the saturate condition to improve the operating frequencies of processor 112. The techniques disclosed herein can be extended to reduce the number of logic levels used in the subtraction of operands of varying bit-widths and data formats.

Figure 2:
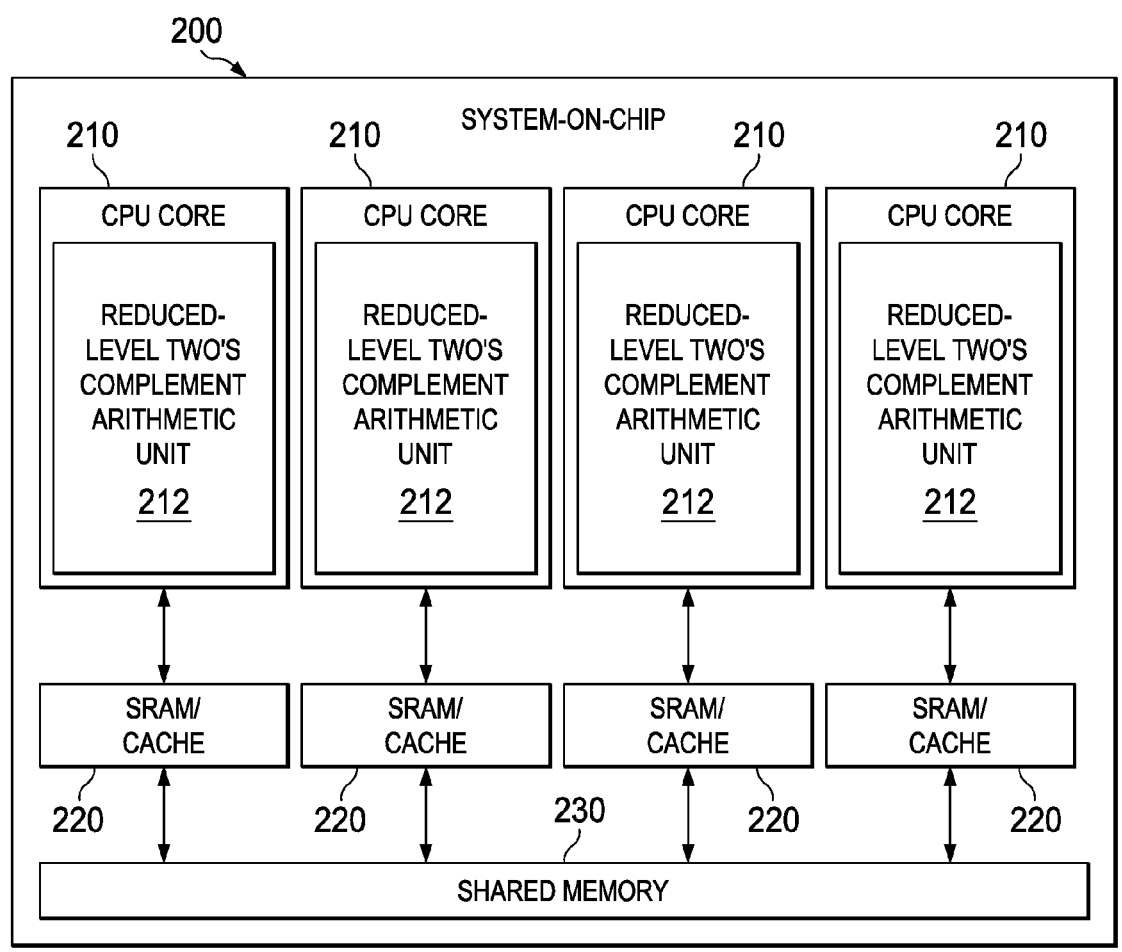
FIG. 2 is a block diagram illustrating a computing system including a reduced-level two's complement arithmetic unit in accordance with embodiments of the disclosure.

FIG. 2 is a block diagram illustrating a computing system including a reduced-level two's complement arithmetic unit in accordance with embodiments of the disclosure. Computing system 200 is illustrated including one or more CPU cores 210, SRAM/Caches 220, and shared memory 230. Often the illustrated elements of the computing system 200 are formed using a common substrate although the elements also are often implemented in separate circuit boards and packages (including the shared memory 230).

Each CPU core 210 includes a reduced-level two's complement arithmetic unit 212 for improving the cycle times of subtraction instructions. Each CPU core 210 has a local memory such as SRAM/Cache 220 to provide relatively quick access to read and write memory. Additionally, each CPU core 210 is coupled to a shared memory 230, which usually provides slower (and typically less expensive) memory accesses than SRAM/Cache 220. The shared memory 230 stores program and data information that can be shared between each CPU core 210.

Figure 3:
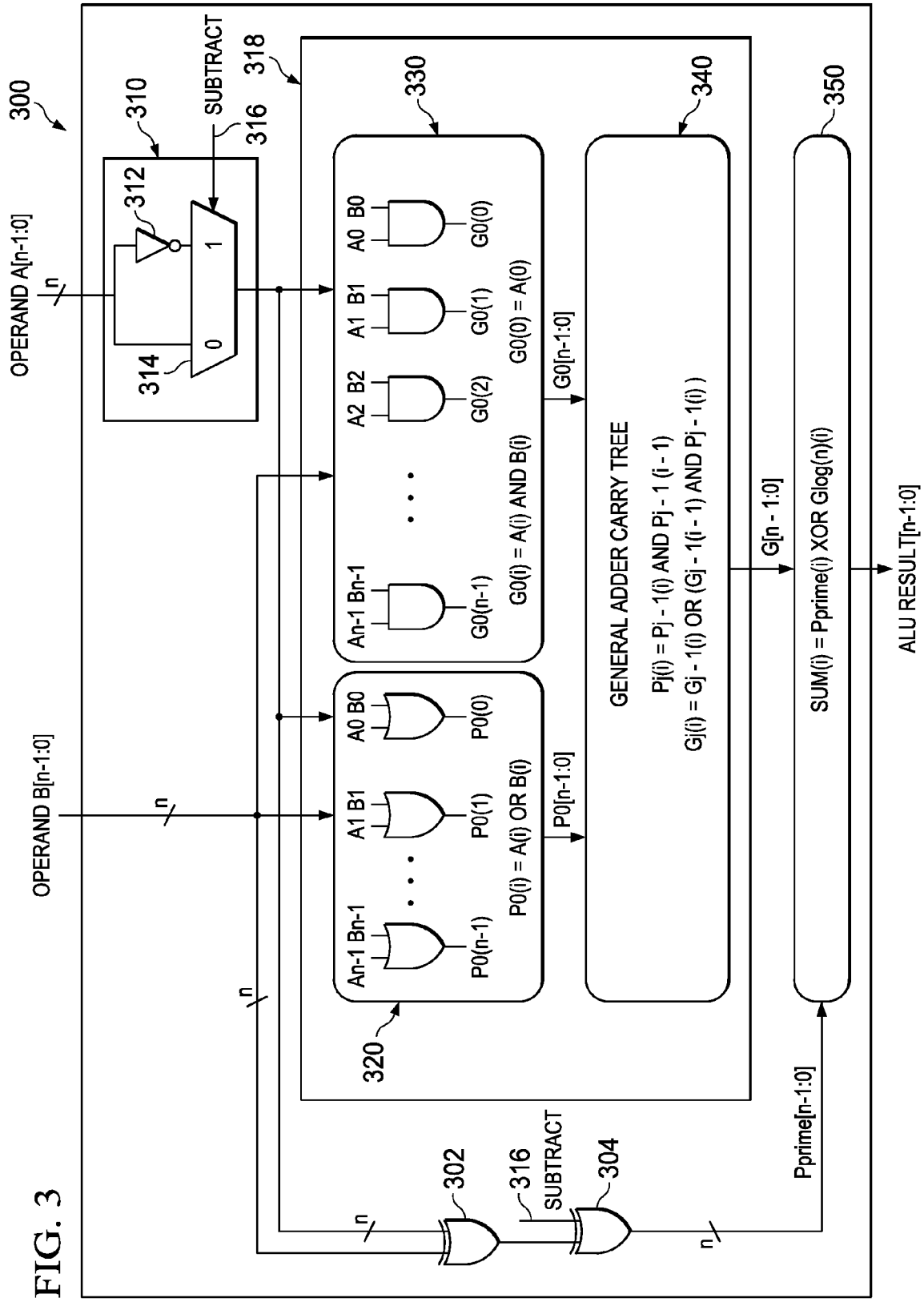
FIG. 3 is a block diagram illustrating a reduced-level two's complement arithmetic unit in accordance with embodiments of the disclosure.

FIG. 3 is a block diagram illustrating a reduced-level two's complement arithmetic unit in accordance with embodiments of the disclosure. In the illustrated embodiment, the reduced-level two's complement arithmetic unit 300 is a parallel prefix form carry look-ahead adder. (It is understood that the teachings disclosed herein can be applied to adders of other forms as well.) The reduced-level two's complement arithmetic unit 300 receives bits [n−1:0] of operand B and receives bits [n−1:0] of operand A and in response generates ALU (arithmetic logic unit) result T[n−1:0] using a selected arithmetic operation. The type of arithmetic operation is selected by the state of the Subtract signal 316.

The reduced-level two's complement arithmetic unit 300 includes an inverting selector 310, a carry generator 318, and an ALU sum generator 350. The carry generator 318 includes a P0 (e.g., initial propagate bit) term generator 320, a G0 (e.g., initial generate bit) term generator 330, and a general adder carry tree 340. The inverting multiplexer 310 receives bits [n−1:0] of operand A. An inverter 312 of the inverting multiplexer 310 is used to invert each of the received bits of operand A. The inverted bits of operand A are coupled to a first input of multiplexer 314 whereas the non-inverted bits of operand A are coupled to a second input of multiplexer 314. One of the first and second set of inputs is selected (and output from the output of the multiplexer 314) in accordance with a control signal.

Subtract signal 316 is used to select between non-inverted bits and inverted bits of operand A. When the reduced-level two's complement arithmetic unit 300 is used to perform an addition operation, the Subtract signal 316 directs the multiplexer 314 to select the non-inverted bits of operand A. When the reduced-level two's complement arithmetic unit 300 is to perform a subtraction operation, the Subtract signal 316 directs the multiplexer 314 to select the inverted bits of operand A. Thus, the innermost negation (e.g. the "not(A)" portion) of the subtraction equation using two's complement arithmetic (using the identity "A−B=not (not (A)+B)") is performed in the critical path of the reduced-level two's complement arithmetic unit 300 (as discussed below with reference to FIG. 4).

The output bits of the inverting multiplexer 310 are coupled to the first set of inputs of P0 term generator 320, G0 term generator 330, and exclusive-OR gates 302. Likewise, the bits of operand B are to a second set of inputs of the P0 term generator 320, the G0 term generator 330, and exclusive-OR gates 302.

The exclusive-OR gates 302 perform an addition portion of the "(not (A)+B)" equation. The outputs of the exclusive-OR gates 302 are coupled to a first set of inputs of exclusive-OR gates 304, which acts as an inverting selector that is controlled in response to a second set of inputs. The Subtract signal 316 is coupled to the second set of inputs of the exclusive-OR gates 304. Thus the "outer" negation of the equation "not (not (A)+B)" is controllably selected by the Subtract signal 316. The output of the exclusive-OR gates 304 is signal Pprime, which is coupled to a first set of inputs of ALU sum generator 350.

Carry bits are determined using carry generator 318. The P0 term generator 320 (of carry generator 318) performs a bit-wise OR operation between corresponding pairs of bits of operand A and operand B in accordance with the formula:

$$P0(i)=A(i) \text{ OR } B(i)$$

where "i" is an index that ranges from 0 to n−1, where n is the number of bits in each of operand A and operand B.

The G0 term generator 330 (of carry generator 318), performs a bit-wise AND operation between corresponding pairs of bits of operand A and operand B in accordance with the formula:

$$G0(i)=A(i) \text{ AND } B(i)$$

where "i" is an index that ranges from 0 to n−1, where n is the number of bits in each of operand A and operand B.

The general adder carry tree 340 receive the initial propagate bits (from propagates generated carries between adjacent bits of the intermediate terms "Pn" and "Gn" in accordance with the formulas:

$$Pj(i)=Pj-1(i) \text{ AND } Pj-1(i-1)$$

$$Gj(i)=Gj-1(i) \text{ OR } (Gj-1(i-1) \text{ AND } Pj-1(i))$$

where i=n−1, . . . , 0; where j=log(n), . . . , 0. When a 32-bit adder is implemented for example, the index "i" ranges from 31 down to 0 (e.g., i=31, 30, . . . , 1, 0) and index "j" ranges from 5 down to 1 (e.g., j=5,4,3,2,1). Thus, the general adder carry tree 340 for a 32-bit adder includes five levels of complexity (e.g., "vertical stages") for generating culminating propagate bits and generated bits at the lowest (as illustrated) stage. The culminating propagate bits and generated bits are coupled to a second set of inputs of the ALU result generator 350.

The ALU result generator 350 determines the output of the reduced-level two's complement arithmetic unit 300. The ALU result generator 350 performs a bit-wise XOR operation between each bit of signal Pprime (from XOR gates 304) and a corresponding (culminating) generated bit (from general adder carry tree 340) in accordance with the formula:

$$\text{Sum}(i)=P\text{prime}(i) \text{ XOR } G \log(n)(i)$$

where "i" is an index that ranges from 0 to n−1, where n is the number of bits in each of operand A and operand B. The result of the ALU result generator 350 is output as signal ALU Result T[n-1:0]. The ALU result generator 350 optionally outputs a final carry-out signal if desired.

Figure 4:
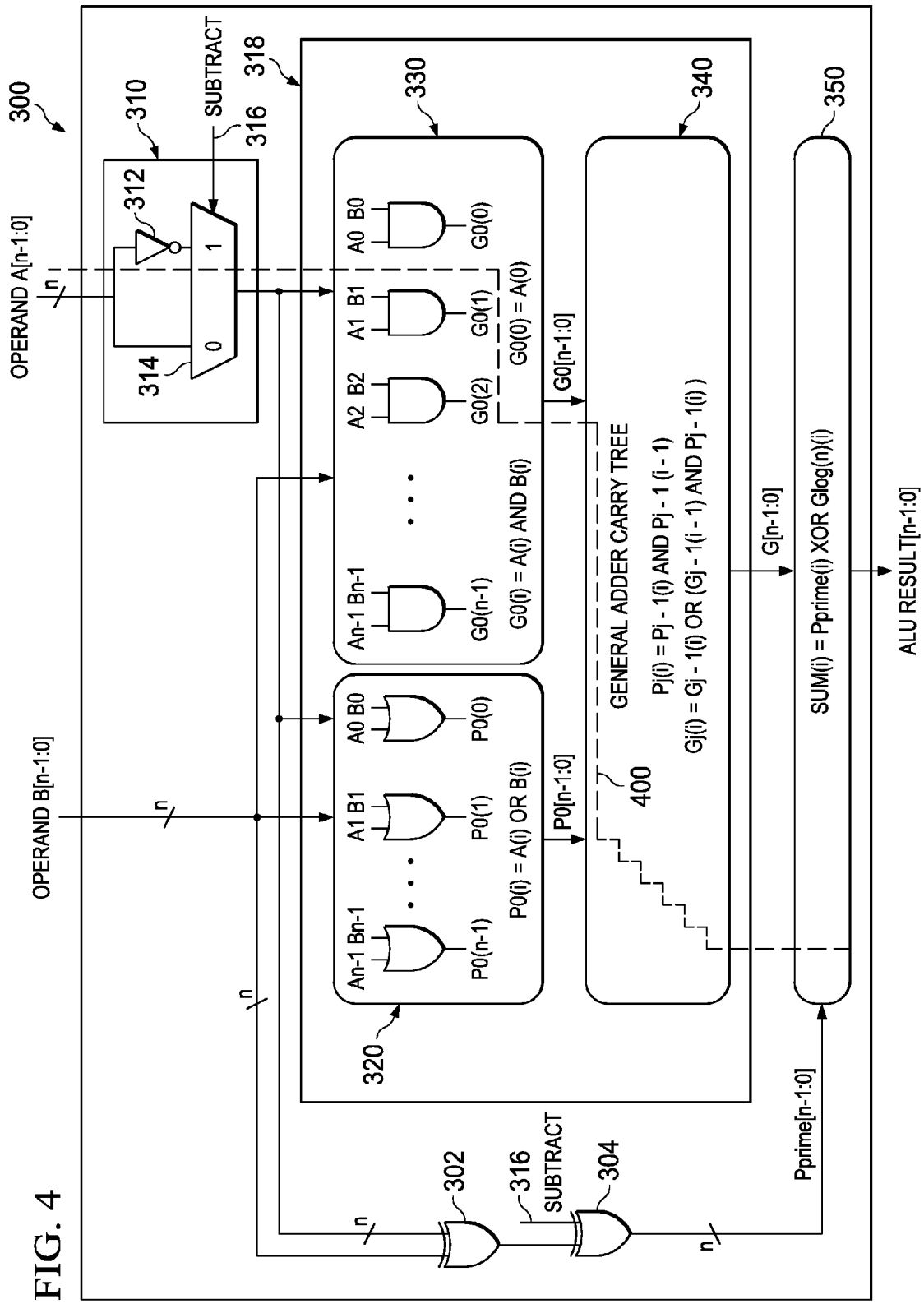
FIG. 4 is a block diagram illustrating a critical path through a reduced-level two's complement arithmetic unit in accordance with embodiments of the disclosure.

FIG. 4 is a block diagram illustrating a critical path through a reduced-level two's complement arithmetic unit in accordance with embodiments of the disclosure. In particular, path 400 through the reduced-level two's complement arithmetic unit 300 is illustrated as including the inverting selector 310, the G0 term generator 330, the general adder carry tree 340, and ALU sum generator 350.

As discussed above, when executing a subtraction instruction using two's complement arithmetic in accordance with the present disclosure, the subtraction is performed in accordance with the identity:

$$A-B=\text{not}(\text{not}(A)+B)$$

where A is a first operand and B is a second operand that is to be subtracted from A. The inverter 312 is used to perform the innermost inversion of A, and XOR-gate 304 is used to controllably perform the outermost inversion of (not(A)+B) in response to the Subtract 316 signal. Thus, the latencies of XOR gates 302 and 204 occur during the latency of carry generator 318 and thus do not add to the length of time (and/or level of complexity) of the critical path 400. The reduction in the number of levels of complexity of the disclosed embodiment over conventional adders can be seen in light of the present disclosure as follows.

Conventional adders typically execute a subtraction instruction using two's complement arithmetic in accordance with the identity:

$$A-B=A+\text{not}(B)+1$$

where A is a first operand and B is a second operand that is to be subtracted from A. The conventional identity is expressed according to the logical equation:

$$G0(0)=(A(0) \text{ AND } B(0)) \text{ OR } (Cin \text{ AND } A(0)) \text{ OR } (Cin \text{ AND } B(0))$$

where G0(0) is the initial generate bit for the first bit (e.g., bit 0) A(0) is the first bit of operand A, B(0) is the first bit of operand B, and Cin is a carry-in bit. It can be seen from the expressed logical equation that at least two levels are required to perform the logic equation: first, the AND function is evaluated using A(0) and B(0) as inputs to produce an intermediate result, which is then logically ORed with C(in) to produce the output G0(0).

The conventional identity can alternatively (e.g., for the purpose of equalizing propagation delays) be expressed according to the logical equation:

$$G0(0)=(A(0) \text{ AND } B(0)) \text{ OR } (Cin \text{ AND } (A(0) \text{ OR } B(0)))$$

where G0(0) is the initial generate bit for the first bit (e.g., bit 0) A(0) is the first bit of operand A, B(0) is the first bit of operand B, and Cin is a carry-in bit. It can be seen from the alternate equation that at least two levels are still required to perform the expressed logic equation, where the AND functions are evaluated first to produce intermediate results, which are then logically ORed together to produce the output G0(0).

In contrast, the reduction in levels of the disclosed embodiment is shown by the least significant bit of the G0 term generator 330 (bit 0) equation, where:

$$G0(0)=A(0) \text{ AND } B(0)$$

where the AND operation is a one level operation (as compared to at least two levels of the conventional art). As illustrated in FIG. 4, the outermost negation of the identity of the disclosed embodiment is performed by XOR gates 304 at a level that is parallel to (for example) the general adder carry tree 340. Likewise, logic function of XOR gates 302 is (for example) performed in parallel with P0 term generator 320 and G0 term generator 330. Thus, the latency of XOR gates 304 (and XOR gates 302) does not contribute to lengthening the critical path 400, and the overall latency of the disclosed arithmetic used is reduced.

Furthermore, moving the parallel XOR gates (e.g., gate 302) used in the final sum calculation out of the critical path allows OR gates to be used in place of the parallel XOR Gates. Using OR gates in P0 term generator 320 (which are substantially faster than XOR gates) more closely matches the propagation delays of the AND gates of G0 term generator 330, which thus allows more efficient selection of power, area, and speed tradeoffs as design considerations.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A two's complement adder, comprising:
   a first inverting selector that is arranged to perform a first inversion upon a first operand in response to a signal selecting a subtraction operation;
   a carry generator that is arranged to generate culminating generate bits for generating carry bits in response to the inverted first operand and a second operand;
   a second inverting selector that is arranged in parallel with the carry generator and that is arranged to perform in response to the signal selecting a subtraction operation a second inversion upon the results of a bit-wise logical operation of the second operand and the first inverted operand; and
   a sum generator that is arranged to generate a sum in response to the generated culminating generate bits and the results of the second inversion.

2. The adder of claim 1, wherein the first inverting selector, the carry generator, and the sum generator include a critical path of the adder that defines a latency of the adder.

3. The adder of claim 2, where in a latency of the second inverting selector does not contribute to the latency of the adder.

4. The adder of claim 3, wherein the bit-wise logical operation of the second operand and the first inverted operand is an addition operation.

5. The adder of claim 3, wherein the bit-wise logical operation of the second operand and the first inverted operand is an exclusive-OR operation.

6. The adder of claim 1, wherein the carry generator comprises an initial propagate bit generator, an initial generate bit generator, and a general adder carry tree, wherein the initial propagate bit generator and the initial generate bit generator each are coupled to receive the second operand and the first inverted operand, and wherein the general adder carry tree is arranged to generate the culminating generate bits in response to generated initial propagated bits and generated initial generate bits.

7. The adder of claim 6, wherein the initial propagate bit generator is arranged perform a bit-wise logical OR operation on each corresponding pair of bits of the second operand and the first inverted operand.

8. The adder of claim 7, the initial generate bit generator is arranged perform a bit-wise logical AND operation on each corresponding pair of bits of the second operand and the first inverted operand.

9. The adder of claim 1, wherein the second inverting selector is performed using a bit-wise exclusive-OR operation.

10. The adder of claim 1, wherein the sum generator is arranged to generate the sum in response to a bit-wise exclusive-OR operation of the generated culminating generate bits and the results of the second inversion.

11. A processing system, comprising:
a memory arranged in a substrate for storing instructions to be executed and for storing data to be manipulated; and
at least one processor arranged in the substrate for executing the stored instructions and to manipulate the stored data, the at least one processor comprising a two's complement adder that is arranged to perform a first inversion upon a first operand in response to a signal selecting a subtraction operation, to generate culminating generate bits for generating carry bits in response to the inverted first operand and a second operand, to perform in response to the signal selecting a subtraction operation a second inversion upon the results of a bit-wise logical operation of the second operand and the first inverted operand, and to generate a sum in response to the generated culminating generate bits and the results of the second inversion.

12. The system of claim 11 wherein the two's complement adder is arranged to perform the generation of the culminating generate bits for generating carry bits in response to the inverted first operand and a second operand in parallel with the performing in response to the signal selecting a subtraction operation a second inversion upon the results of a bit-wise logical operation of the second operand and the first inverted operand.

13. The system of claim 11 wherein the performance of a first inversion upon the first operand in response to the signal selecting a subtraction operation, the generation of the culminating generate bits for generating carry bits in response to the second operand and the inverted first operand, and the generation of the sum in response to the generated culminating generate bits and the results of the second inversion each have latencies that contributes to a critical path of the adder.

14. The system of claim 13 wherein the performing in response to the signal selecting a subtraction operation a second inversion upon the results of a bit-wise logical operation of the second operand and the first inverted operand does not have a latency that contributes to the critical path of the adder.

15. The system of claim 11 wherein the culminating generate bits are generated in response to generated initial propagated bits and generated initial generate bits, wherein the initial propagate bits are generated in response to a bit-wise logical OR operation of the second operand and the first inverted operand, and the initial generate bits are generated in response to a bit-wise logical AND operation of the second operand and the first inverted operand.

16. The system of claim 15 wherein the second inversion is performed upon the results of a bit-wise logical exclusive-OR operation of the second operand and the first inverted operand.

17. The system of claim 11 wherein the sum is generated in response to a bit-wise logical exclusive-OR operation of the generated culminating generate bits and the results of the second inversion.

* * * * *